(12) United States Patent
Mahowald

(10) Patent No.: US 7,034,704 B2
(45) Date of Patent: Apr. 25, 2006

(54) SYSTEM POWERED VIA SIGNAL ON GAS PIPE

(76) Inventor: Peter H. Mahowald, 71 San Juan Ct., Los Altos, CA (US) 94022

( * ) Notice: Subject to any disclaimer, the term of this patent is extended or adjusted under 35 U.S.C. 154(b) by 121 days.

(21) Appl. No.: 10/852,562

(22) Filed: May 24, 2004

(65) Prior Publication Data

US 2005/0258974 A1    Nov. 24, 2005

(51) Int. Cl.
*G08B 17/10* (2006.01)
(52) U.S. Cl. ................................ 340/632; 204/404
(58) Field of Classification Search ............... 340/632; 324/348; 204/404, 196.36
See application file for complete search history.

(56) References Cited

U.S. PATENT DOCUMENTS

| 3,622,489 A |   | 11/1971 | Dumitrescu et al. |
| 3,786,423 A | * | 1/1974  | Martell .................. 340/870.03 |
| 3,999,121 A | * | 12/1976 | Taylor, Jr. .................... 324/323 |
| 4,384,925 A | * | 5/1983  | Stetter et al. ............. 205/785.5 |
| 4,438,391 A | * | 3/1984  | Rog et al. .................. 324/71.1 |
| 4,808,292 A | * | 2/1989  | Kessler et al. .............. 600/345 |
| 6,840,084 B1 | * | 1/2005  | Nikolskaya ................. 73/23.2 |

* cited by examiner

*Primary Examiner*—John Tweel, Jr.

(57) ABSTRACT

A system comprises a first conductor configured to receive a signal via a supply side gas pipe, a second conductor configured to receive a reference signal via a reference path, and a circuit coupled to the first conductor and the second conductor. The circuit is configured to receive the signal and the reference signal to provide power to the system.

21 Claims, 3 Drawing Sheets

SYSTEM POWERED VIA SIGNAL ON GAS PIPE

BACKGROUND

In a natural gas distribution system, gas is distributed to customers through a network of pipes. A gas meter at each customer's site measures the amount of fuel used by the customer. The gas meter is read to determine how much gas was used, and the gas company charges the customer based on the gas meter reading.

To obtain a gas meter reading, a gas company employee can observe the gas meter or, in an automated system, an automated gas meter reader can obtain the gas meter reading from the gas meter. An automated gas meter reader is a type of sensor coupled to the gas meter. The automated gas meter reader obtains meter readings from the gas meter and transmits usage data to the gas company. In one system, the automated gas meter reader wirelessly transmits usage data to a gas company employee driving along the street in a computer-equipped vehicle. With automated gas meter readers installed at each customer's site, collecting meter readings can be accomplished much faster and more economically.

In a system including sensors, such as automated gas meter readers, the sensors may be situated in locations that are not near a convenient power source. Each sensor can include its own power source, such as a battery, solar power unit or vibrational power unit, and/or each sensor may be hardwired to a power supply.

Each of these techniques for supplying power to a sensor has one or more drawbacks. The sensors may be situated in locations that do not receive enough light for solar power units or vibrations for vibrational power units. Also, vibrational power units are typically more expensive than alternative solutions. Wiring can be expensive to install, especially in facilities or houses that are already built, and batteries can discharge before the product service lifetime is over. For these and other reasons there is a need for the present invention.

SUMMARY

One aspect of the present invention provides a system comprising a first conductor configured to receive a signal via a supply side gas pipe, a second conductor configured to receive a reference signal via a reference path, and a circuit coupled to the first conductor and the second conductor. The circuit is configured to receive the signal and the reference signal to provide power to the system.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
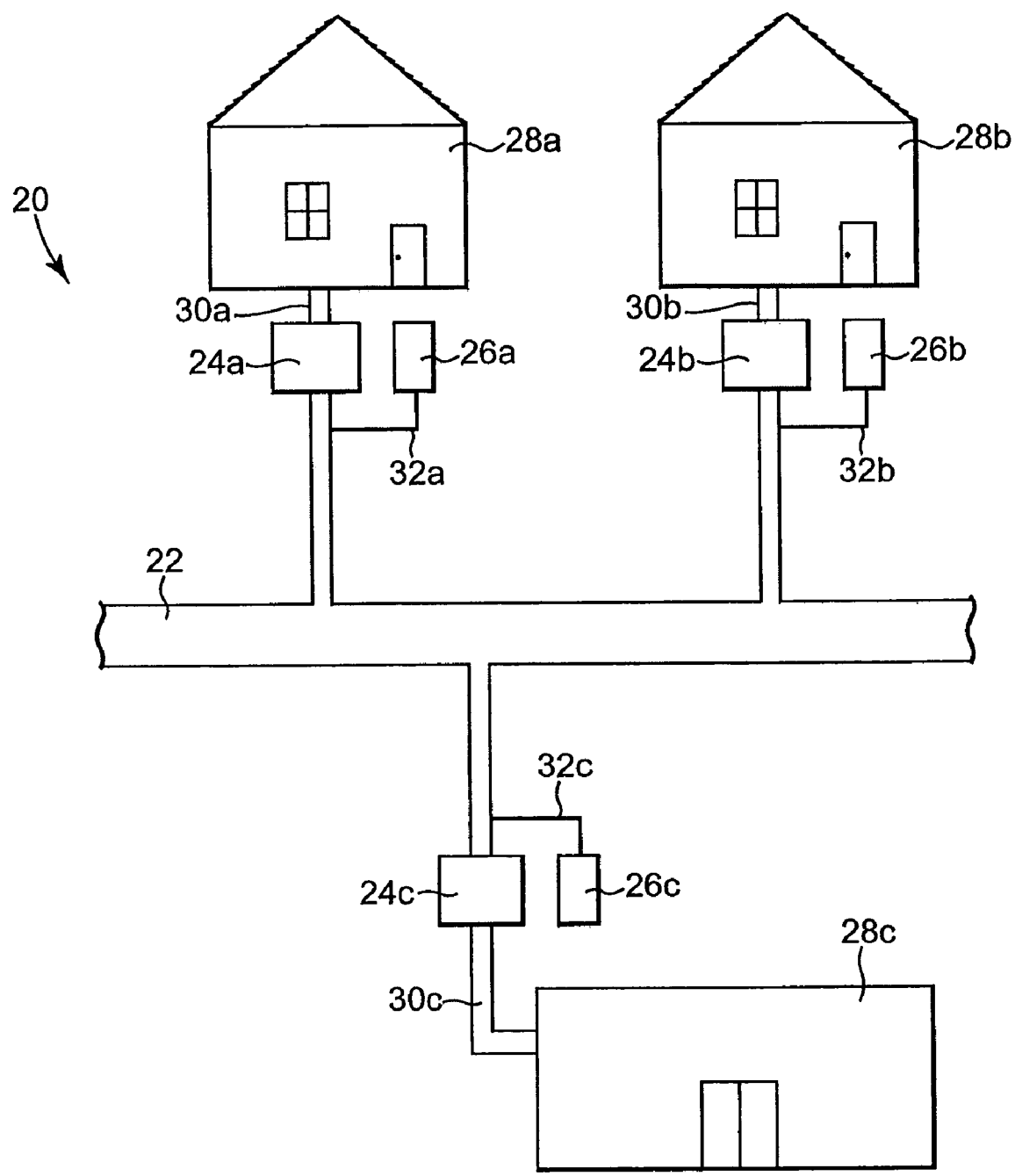
FIG. 1 is a diagram illustrating one embodiment of a portion of a natural gas distribution system.

FIG. 1 is a diagram illustrating one embodiment of a portion of a natural gas distribution system 20. Natural gas distribution system 20 includes gas pipe 22, gas meters 24a–24c, sensors 26a–26c, and customer sites 28a–28c. Customer sites 28 include residential customer sites, such as customer sites 28a and 28b, and commercial customer sites, such as customer site 28c.

Gas pipe 22 is coupled to each of the gas meters 24a–24c. Gas meter 24a is coupled to customer site 28a through customer side gas pipe 30a. Gas meter 24b is coupled to customer site 28b through customer side gas pipe 30b and gas meter 24c is coupled to customer site 28c through customer side gas pipe 30c. Each of the customer side gas pipes 30a–30c is routed in the corresponding customer site 28a–28c to deliver natural gas to one or more points where the gas is used in the corresponding customer site 28a–28c.

Gas pipe 22 is a supply side gas pipe 22 that delivers natural gas to each of the gas meters 24a–24c. As gas is used at one of the customer sites 28a–28c, the gas flows through the corresponding gas meter 24a–24c to the corresponding customer side gas pipe 30a–30c. Each gas meter 24a–24c measures the quantity of gas that flows into the corresponding customer site 28a–28c.

Each of the sensors 26a–26c is associated with a customer site 28a–28c. Sensor 26a is associated with customer site 28a, sensor 26b is associated with customer site 28b, and sensor 26c is associated with customer site 28c. Also, each of the sensors 26a–26c is electrically coupled to supply side gas pipe 22. Sensor 26a is electrically coupled to gas pipe 22 via conductor 32a, sensor 26b is electrically coupled to gas pipe 22 via conductor 32b, and sensor 26c is electrically coupled to gas pipe 22 via conductor 32c. Sensors 26a–26c receive power through gas pipe 22 and the corresponding conductor 32a–32c. Sensors 26a–26c can be any suitable sensors for measuring and/or receiving any suitable readings. In other embodiments, other circuits contained in various other types of suitable electrical devices, such as a water meter, an electric meter, and/or a fiber optic repeater, receive power through gas pipe 22 and the corresponding conductor 32a–32c.

In one embodiment, each of the sensors 26a–26c receives readings about gas distribution system 20. In one embodiment, sensors 26a–26c operate as automated gas meter readers to obtain meter readings from gas meters 24a–24c. Sensor 26a obtains gas meter readings from gas meter 24a, sensor 26b obtains gas meter readings from gas meter 24b, and sensor 26c obtains gas meter readings from gas meter 24c. In one embodiment, each of the sensors 26a–26c receives electrical pulses that indicate gas usage from the corresponding gas meter 24a–24c. In another embodiment, each of the sensors 26a–26c includes an imager that reads the dials of the corresponding gas meter 24a–24c to obtain the gas meter reading.

In one embodiment, each of the sensors 26a–26c measures a signal level on gas pipe 22. The signal on gas pipe 22 is a cathodic protection voltage signal that is used to power sensors 26a–26c. Each of the sensors 26a–26c measures the signal level on gas pipe 22 at the corresponding customer site 28a–28c. Sensor 26a measures the signal on gas pipe 22 at customer site 28a, sensor 26b measures the signal on gas pipe 22 at customer site 28b, and sensor 26c measures the signal on gas pipe 22 at customer site 28c. The signal level on gas pipe 22 is measured at each of the customer sites 28a–28c and known at a number of locations along gas pipe 22.

In one embodiment, each of the sensors 26a–26c receives security data from the corresponding customer site 28a–28c. Security data includes security information, such as perimeter security alarms and gas meter tamper alarms.

Sensors 26a–26c obtain readings and communicate data to a reporting company, such as the gas company. In one embodiment, data is communicated over a wire, such as a telephone wire, from each of the sensors 26a–26c to the gas company. In one embodiment, data is communicated wirelessly from each of the sensors 26a–26c to the gas company. Sensors 26a–26c can communicate wirelessly to a computer in a computer-equipped truck driven through the neighborhood. Each sensor 26a–26c downloads data to the computer in the truck. The downloaded data can include gas usage data, security tamper alarm data, and the signal level on gas pipe 22.

The signal level on supply side gas pipe 22 indicates the cathodic protection level on gas pipe 22. The cathodic protection voltage signal on gas pipe 22 is maintained by the gas company to protect gas pipe 22 from corrosion. Metal gas pipes that do not carry a cathodic protection voltage are susceptible to corrosion.

Figure 2:
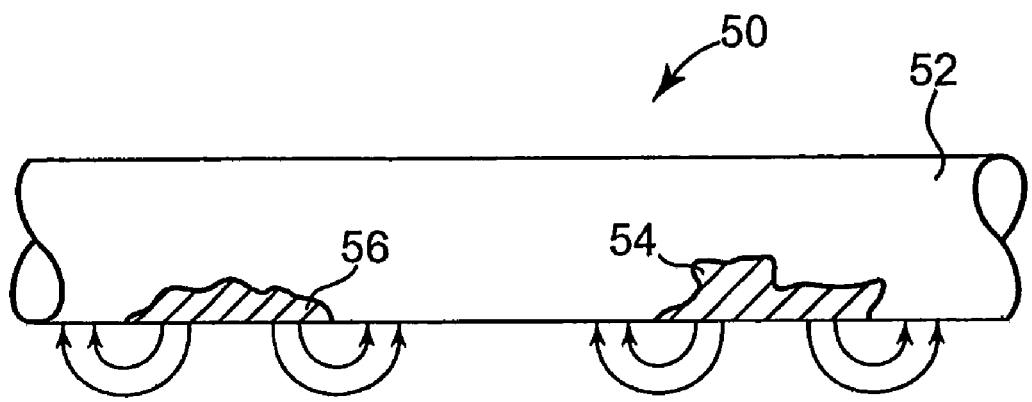
FIG. 2 is a diagram illustrating a buried gas pipe that does not carry a cathodic protection voltage.

FIG. 2 is a diagram illustrating a buried gas pipe 50 that does not carry a cathodic protection voltage. Buried gas pipe 50 includes coated area 52 and uncoated areas 54 and 56. Buried gas pipe 50 is made from steel, which includes iron that corrodes in reaction with the surrounding environment. The iron oxidizes into rust. In severe cases of rust, a hole can be created in the buried gas pipe 50 such that gas escapes into the surrounding environment through the hole.

Coating buried gas pipe 50 with a coating, such as paint, isolates buried gas pipe 50 from the surrounding environment to reduce the rate of corrosion. However, buried gas pipe 50 continues to rust where complete isolation is not achieved, such as at pores, scratches, or other discontinuities in the coating. Also, buried gas pipe 50 continues to rust where the coating is lifted from buried gas pipe 50 and moisture has leaked through the coating.

Corrosion is the result of an electro-chemical process involving an anodic reaction and a cathodic reaction. In the anodic reaction, electrons are released and metal goes into the surrounding environment as positive ions. Current flows in the electrolyte from the anode where the anodic reaction took place to the cathode where the cathodic reaction takes place. The electrons released by the anodic reaction do not move through the electrolyte. Instead, the electrons move in an external circuit, such as through the metal pipe, from the anode to the cathode. In the cathodic reaction, the electrons released by the anodic reaction are discharged to maintain electrical neutrality. The anodic and cathodic reactions in the corrosion of iron can be written as follows:

At the anode where the metal goes into the surrounding environment—

Fe (solid)→Fe++ (ion)+2e− (electrons).

At the cathode—

2H+ (ions)+2e−→H2 (gas) or

2H+ (ions)+½O2 (air)+2e−→H2O or

O2+2H2O+4e−→4OH− (hydroxyl ions).

Iron ions (Fe++) released by the anodic reaction interact with hydroxyl ions (OH−) generated by cathodic reactions to form Fe(OH)2 near the boundaries of the anodic and cathodic areas. Oxygen reaching the Fe(OH)2 reacts with it to form Fe(OH)3 and eventually rust, Fe2O3.

On a steel surface, one portion of the steel surface acts as an anode and another portion of the steel surface acts as a cathode. Whether a particular area of a steel surface acts as an anode or a cathode is determined by a number of factors. One factor is the condition of a thin air-formed oxide film that exists on dry steel. Such films induce a modest level of passivity that makes the film-covered surface more cathodic than the areas not covered by the air-formed oxide film. Observations of steel surfaces immersed in water for several days have shown that about 50% of the surface corrodes as an anode with the remaining 50% acting as a cathode. As time progresses, there is a break down of the protective films on the original cathodic surfaces so that corrosion spreads over the surface. However, a division between anodic and cathodic areas persists with the cathodic areas being protected from corrosion by currents flowing from adjacent anodic areas through the surrounding environment. Iron ions flow from the anodic areas to the cathodic areas and electrons flow in the metal from the anodic areas to the cathodic areas. Coating a steel surface with a coating, such as paint, makes the coated area more cathodic than areas where complete isolation is not achieved, such as at pores, scratches, or other discontinuities in the coating. The uncoated areas act as anodes and corrode to produce rust.

Buried gas pipe 50 has been coated with a coating, such as paint, to make the buried gas pipe 50 more cathodic and prevent corrosion. The buried gas pipe 50 includes coated area 52 that is cathodic and uncoated areas 54 and 56 that are anodic areas situated at discontinuities in the coating on buried gas pipe 50. Uncoated areas 54 and 56 act as anodes and provide iron ions that flow into the soil and onto the cathodic coated area 52, indicated with arrows. The soil operates as an electrolyte. The electrons released in the anodic reaction flow through buried gas pipe 50 to the cathodic coated area 52 to accommodate reduction of hydrogen ions and oxygen at the cathodic coated area 52. With electrons supplied from the uncoated areas 54 and 56 to the cathodic coated area 52, iron is not oxidized at coated area 52.

Cathodic protection of the entire buried gas pipe 50 is achieved by substituting electrons from an external source for the electrons otherwise generated in the anodic reaction at uncoated areas 54 and 56. The substitute electrons supplied from an external source to buried gas pipe 50 accommodate reduction of hydrogen ions and oxygen at all surfaces of buried gas pipe 50. Cathodic protection of steel is achieved when the potential on the steel has been changed from a less negative number to a more negative number, such as approximately negative 850 millivolts, in relation to the soil or ground. To prevent a phenomenon known as hydrogen blistering of paints, the potential resulting from cathodic protection is maintained at a voltage less negative than negative 1.2 volts.

Coatings on pipelines and other underground structures frequently need to protect very large areas of underground metal. Such large areas, when coated and buried, cannot remain permanently free of all pinholes, developed defects, or outside damage. Even though the coating is initially free of holes in the film, pipe movement with temperature variations, soil stresses, and damage from outside sources will ultimately expose bare metal to the corrosive effect of the surrounding environment (soil and/or water). Even though 99.9999% of the surface area remains fully and effectively protected by the coating, the remaining 0.0001% could be a problem. On ten miles of 48 inch pipe, this 0.0001% represents 0.6635 square feet of exposed metal, which is on the order of 50½ inch diameter holes in the coating for each mile of pipeline. A cathodic protection scheme including substitute electrons from an external source makes the entire surface area of the pipeline cathodic in relation to the surrounding environment to protect the pipe from corrosion at discontinuities in the coating.

Figure 3:
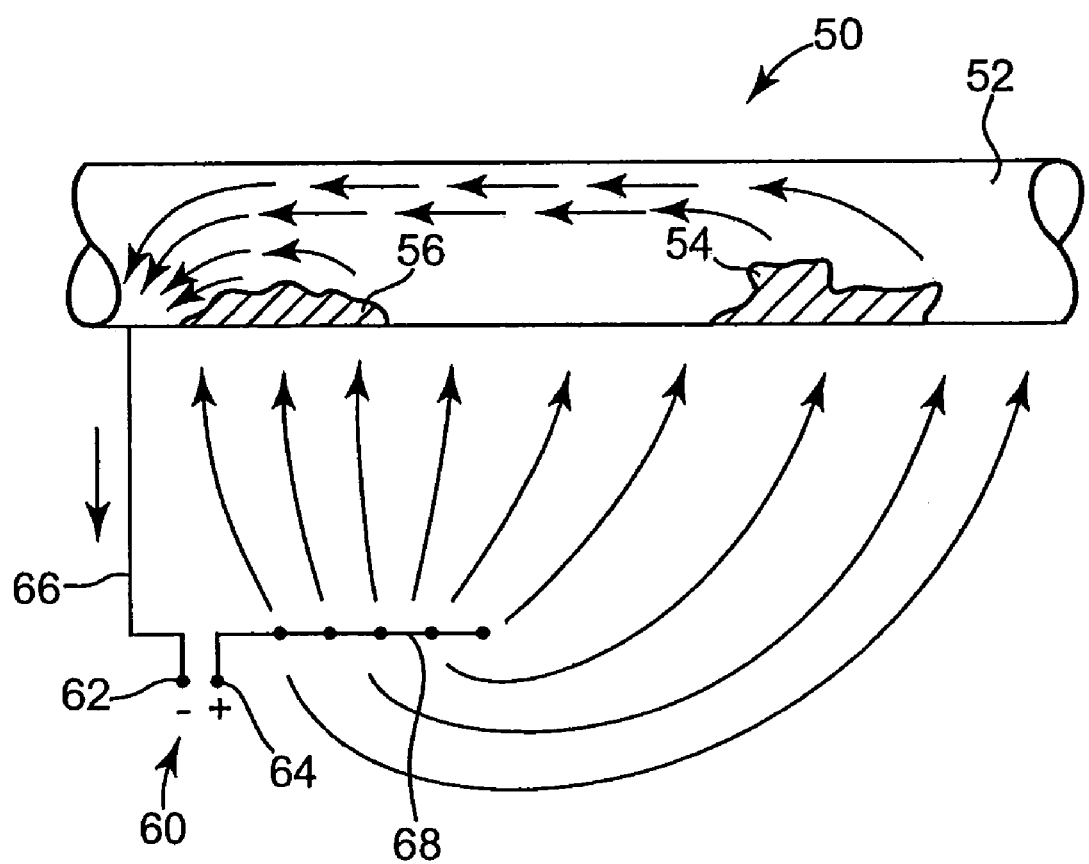
FIG. 3 is a diagram illustrating one embodiment of a buried gas pipe and a source of direct current.

FIG. 3 is a diagram illustrating one embodiment of a buried gas pipe 50 and a source of direct current 60. The buried gas pipe 50 includes coated area 52 and uncoated areas 54 and 56. Direct current flows from the source of direct current 60 into the surrounding soil and on to the surface of buried gas pipe 50. The direct current neutralizes and counteracts the natural corrosion currents that would otherwise discharge from uncoated areas 54 and 56.

The source of direct current 60 includes a negative terminal 62 and a positive terminal 64. The negative terminal 62 is electrically coupled to buried gas pipe 50 via conductor 66. The positive terminal 64 is electrically coupled to a ground conductor 68 situated in the soil separate from buried gas pipe 50. Ground conductor 68 discharges the positive current in the form of positive ions to buried gas pipe 50. Electrons flow from the negative terminal 62 and on to buried gas pipe 50 through conductor 66. By convention, the direction of current flow is opposite the flow of electrons.

The cathodic protection system is designed to regulate the amount of current discharged from ground conductor 68 as cathodic protection current. The cathodic protection current eliminates the flow of corrosion current from uncoated areas 54 and 56 by converting them to cathodic areas. A net flow is established from the soil and on to the previously anodic uncoated areas 54 and 56. The cathodic protection system ground conductor 68, also known as ground bed or anode bed, discharges current and is subject to corrosion. Thus, a cathodic protection system renders a protected structure surface, such as the surface of buried gas pipe 50, free of corrosion but the cathodic protection system does not eliminate corrosion. Instead, it transfers the corrosive effect from critical operating structures, such as buried gas pipe 50, to known locations, such as ground conductor 68. The ground conductor 68 is replaced periodically without making it necessary to take the protected buried gas pipe 50 out of service.

Criteria have been developed to determine that a structure, such as buried gas pipe 50, has been made completely cathodic such that it is fully protected from corrosion. One of the most used criteria is based on a measurement of the electrical potential between the protected structure and adjacent soil. A positive indicator for steel and cast iron structures is a negative voltage of at least approximately negative 850 millivolts as measured between the structure surface and a reference electrode contacting the soil. In one embodiment the reference electrode is a copper—copper sulfate reference electrode.

When buried gas pipe 50 is under cathodic protection, direct current flows from ground conductor 68 into the soil and onto buried gas pipe 50. A return current, indicated by arrows, flows through buried gas pipe 50 and conductor 66 to negative terminal 62. Electrons flow in the opposite direction from the negative terminal 62 and on to buried gas pipe 50. The previously anodic uncoated areas 54 and 56 receive current from ground conductor 68 and are converted into cathodic areas. The current flow forces buried gas pipe 50 to assume a negative electrical polarity with respect to the soil. Full protection from corrosion has been attained when the cathodic protection voltage on buried gas pipe 50 is approximately negative 850 millivolts or more negative than negative 850 millivolts in relation to the soil.

The company that maintains buried gas pipe 50, which in most cases is the gas company, provides and maintains the cathodic protection system including the source of direct current 60 and ground conductor 68. The gas company measures the cathodic protection voltage signal on buried gas pipe 50 to maintain approximately negative 850 millivolts on buried gas pipe 50. Electrical potentials more negative than negative 850 millivolts indicate wasted energy. In practice, it is usually necessary to maintain more negative potentials at drainage points, such as where conductor 66 contacts buried gas pipe 50, in order to maintain approximately negative 850 millivolts at locations remote from the drainage points. This is primarily a result of attenuation or voltage drops caused by cathodic protection current on buried gas pipe 50 flowing through the resistance of buried gas pipe 50 in order to return to the drainage point and the negative terminal 62 of the source of direct current 60.

The cathodic protection voltage on buried gas pipe 50 varies from one location to another on buried gas pipe 50. It is important for the gas company to know what the cathodic protection voltage is at locations along buried gas pipe 50 and to maintain a cathodic protection voltage of at least approximately negative 850 millivolts on buried gas pipe 50.

Figure 4:
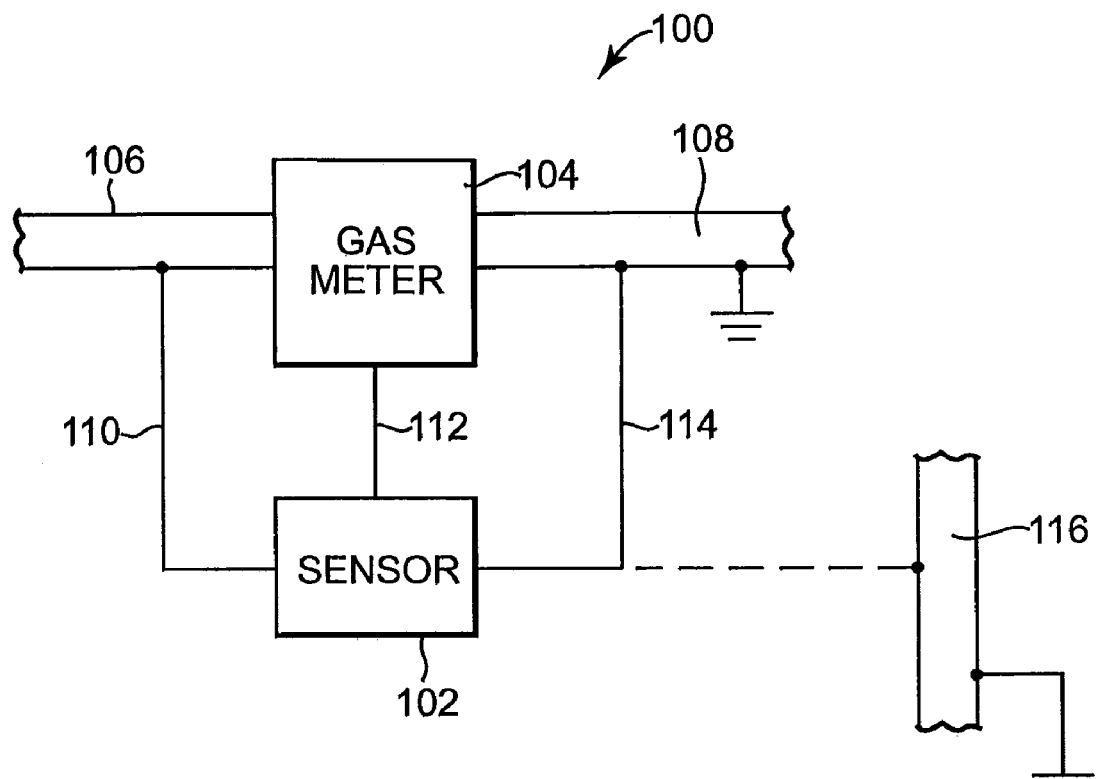
FIG. 4 is a diagram illustrating one embodiment of a natural gas meter reading system.

FIG. 4 is a diagram illustrating one embodiment of a natural gas meter reading system 100. The meter reading system 100 includes a sensor 102 and a gas meter 104. The gas meter 104 is mechanically coupled to a supply side gas pipe 106 and a customer side gas pipe 108. Gas meter 104 electrically insulates supply side gas pipe 106 from customer side gas pipe 108. Gas meter 104 measures the quantity of gas that flows from supply side gas pipe 106 to customer side gas pipe 108.

In one embodiment, meter reading system 100 is part of a gas distribution system, such as gas distribution system 20 of FIG. 1. Sensor 102 is similar to one of the sensors 26a–26c and gas meter 104 is similar to one of the gas meters 24a–24c. Also, supply side gas pipe 106 is similar to gas pipe 22 and customer side gas pipe 108 is similar to one of the customer side gas pipes 30a–30c.

The sensor 102 is electrically coupled to supply side gas pipe 106 via power conductor 110, and to gas meter 104 via conductive path 112. In one embodiment, sensor 102 includes an imager, such as a visual imager, that reads gas meter 104 by imaging the dials of gas meter 104. In another embodiment, sensor 102 receives electrical signals via conductive path 112 from gas meter 104.

Sensor 102 is electrically coupled to a reference, such as ground, via reference conductor 114. In one embodiment, reference conductor 114 is electrically coupled to customer side gas pipe 108, which is electrically coupled to ground via a grounded water pipe or a ground rod. In one embodiment, reference conductor 114 is electrically coupled, indicated in dash lines, directly to a water pipe 116, which is grounded. In other embodiments, reference conductor 114 is electrically coupled to ground in any suitable manner, such as directly to a ground rod.

Supply side gas pipe 106 is a buried gas pipe that carries a cathodic protection voltage signal. The cathodic protection voltage signal is maintained at a voltage level, such as negative 850 millivolts or more negative, to prevent corrosion of supply side gas pipe 106.

Sensor 102 receives the cathodic protection voltage signal on supply side gas pipe 106 via power conductor 110. The sensor 102 regulates the cathodic protection voltage signal to provide a supply voltage and power to sensor 102. Even if the cathodic protection voltage signal on supply side gas pipe 106 is less negative than negative 850 millivolts, sensor 102 may still get enough energy from the cathodic protection voltage signal to power sensor 102. In one embodiment, sensor 102 increases or boosts the voltage difference between the cathodic protection voltage and ground to provide a supply voltage. The boosted supply voltage powers sensor 102.

Sensor 102 measures the cathodic protection voltage signal on supply side gas pipe 106. In one embodiment, the cathodic protection voltage signal measurement is taken through power conductor 110. In another embodiment, the cathodic protection voltage signal measurement is taken via a separate conductor electrically coupled to supply side gas pipe 106 and sensor 102.

The measured value of the cathodic protection voltage signal is stored in sensor 102 and compared to one or more predetermined cathodic protection alarm trigger levels or thresholds. In one embodiment, if the measured cathodic protection voltage level is more positive than negative 850 millivolts, an alarm flag is set and optionally latched to indicate a cathodic protection alarm condition. In one embodiment, if the measured cathodic protection voltage level is more negative than negative 1.2 volts, an alarm flag is set and optionally latched to indicate a different cathodic protection alarm condition. Sensor 102 stores the alarm flags that indicate cathodic protection alarm conditions for transmittal to the gas company.

In one embodiment, one alarm flag indicates the cathodic protection voltage level is low as sensor 102 is being read and another alarm flag indicates the cathodic protection voltage level has been low since the last time sensor 102 was read. In one embodiment, a meter reading is taken when the cathodic protection voltage level goes low and an alarm flag is set and optionally latched. The meter reading indicates about when the alarm flag was set. In another embodiment, a time stamp is taken when the cathodic protection voltage level goes low and an alarm flag is set and optionally latched. The time stamp indicates when the alarm flag was set. In other embodiments, any suitable scheme can be used to provide any suitable information corresponding to an alarm flag, such as when the alarm flag was set and how many times the cathodic protection voltage level has gone low since the last time sensor 102 was read.

Gas meter 104 measures the quantity of gas used and provides readings to sensor 102 via conductive path 112. Sensor 102 receives the gas usage readings from gas meter 104 and compiles gas usage data for retrieval by the gas company. In one embodiment, the sensor 102 reports the current meter reading, from which the gas company can subtract the prior meter reading to determine the amount of gas used.

In another suitable embodiment, sensor 102 includes an imager, such as a visual imager. Sensor 102 reads gas meter 104 by imaging the dials of gas meter 104. The image of the dials is processed to determine the gas meter reading of gas meter 104. Processing of the image to obtain the gas meter reading can occur in sensor 102 or after retrieval by the gas company.

Gas meter 104 includes a tamper alarm device. In the event someone attempts to open and/or manipulate readings from gas meter 104, the tamper alarm is activated. Upon activation of the tamper alarm, gas meter 104 provides a tamper alarm signal to sensor 102 via conductive path 112 or, alternatively, via a tamper conductor electrically coupled to gas meter 104 and sensor 102. Sensor 102 stores the tamper alarm for reporting to the gas company.

Sensor 102 includes communication circuitry for communicating with the gas company. Sensor 102 can communicate directly with the gas company or with another system, such as a home automation system, which communicates with the gas company. In one embodiment, sensor 102 responds to a request for a reading. In one embodiment, sensor 102 automatically calls the gas company to provide a reading. Data transmitted by sensor 102 during a reading includes cathodic protection signal levels and alarms, tamper alarms, and gas usage data, such as the current meter reading.

In one embodiment, sensor 102 communicates with the gas company through a wired line, such as a telephone line. In one embodiment, sensor 102 communicates with the gas company wirelessly. A gas company employee can walk or drive by the location of sensor 102 and wirelessly request a reading from sensor 102. The sensor 102 responds with a reading including cathodic protection signal levels and alarms, tamper alarms, and gas usage data. In other embodiments, wireless data is otherwise centrally collected. Sensor 102 can wirelessly communicate with a wireless receiver/transmitter suitably situated, such as in a satellite, on a telephone pole or on a hill, to transmit the reading to the gas company.

With meter reading system 100 in a gas distribution system similar to gas distribution system 20 of FIG. 1, the cathodic protection voltage signal level on supply side gas pipe 106 is read at each of the customer's sites. If a cathodic protection alarm is triggered at one of the customer's sites, gas company personnel can be sent to verify the problem and provide a solution to maintain cathodic protection and prevent corrosion of supply side gas pipe 106.

Figure 5:
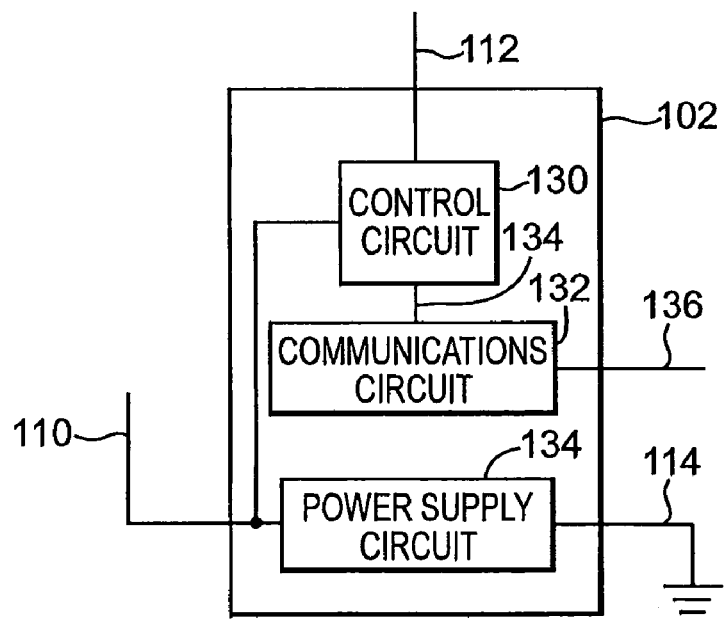
FIG. 5 is a diagram illustrating one embodiment of a sensor in the natural gas meter reading system of FIG. 4.

FIG. 5 is a diagram illustrating one embodiment of sensor 102. The sensor 102 includes a control circuit 130, a communications circuit 132, and a power supply circuit 134. Control circuit 130 is electrically coupled to gas meter 104 (shown in FIG. 4) via conductive path 112 and to supply side gas pipe 106 (shown in FIG. 4) via power conductor 110. In addition, control circuit 130 is electrically coupled to communication circuit 132 via conductive path 134.

Communications circuit 132 is electrically coupled to a communications conductor 136. In one embodiment, communications conductor 136 is configured to be electrically coupled to a phone line. In another embodiment, communications conductor 136 is configured to be electrically coupled to an antenna for wireless communications.

Power supply circuit 134 is electrically coupled to supply side gas pipe 106 via power conductor 110. Power supply circuit 134 receives the cathodic protection voltage signal provided on supply side gas pipe 106 via power conductor 110. In addition, power supply circuit 134 is electrically coupled to ground via reference path 114. In one embodiment, reference path 114 is electrically coupled to customer side gas pipe 108 (shown in FIG. 4), which is grounded. In one embodiment, reference path 114 is electrically coupled to water pipe 116 (shown in FIG. 4), which is grounded. In other embodiments, reference path 114 is electrically coupled to ground in any suitable manner, such as through a ground rod.

Control circuit 130 receives gas readings from gas meter 104 via conductive path 112. In one embodiment, the gas readings are electrical pulses that increase and decrease in frequency based on the amount of gas used. Control circuit 130 counts the electrical pulses and compiles a gas usage count that represents the amount of gas used. In one embodiment, the gas usage count is reset to zero each time sensor 102 is read by the gas company. In this embodiment, the gas usage count represents the amount of gas used since the last reading of sensor 102 by the gas company. In one embodiment, the gas usage count is not reset to zero each time sensor 102 is read. Instead, the gas usage count is a cumulative total that is used to calculate the amount of gas used since the last reading of sensor 102.

Control circuit 130 receives tamper alarm signals from gas meter 104 via conductive path 112. If gas meter 104 is opened or tampered with, a tamper alarm signal is passed from gas meter 104 to control circuit 130. Control circuit 130 records the tamper event by setting a flag to indicate gas meter 104 has been tampered with and readings may be inaccurate.

Control circuit 130 receives the cathodic protection voltage signal provided on supply side gas pipe 106 via power conductor 110. Control circuit 130 includes an analog to digital converter that converts the received cathodic protection voltage signal to a digital value. This digital value is periodically compared to one or more predetermined cathodic protection voltage trigger levels. If a trigger level is exceeded, control circuit 130 sets an alarm flag that indicates the cathodic protection voltage is not within a prescribed limit. In one embodiment, a predetermined trigger level or limit is set at negative 850 millivolts. If the cathodic protection voltage is more positive than negative 850 millivolts, an alarm flag is set by control circuit 130. In one embodiment, a predetermined limit is set at negative 1.2 volts. If the cathodic protection voltage is more negative than negative 1.2 volts, an alarm flag is set by control circuit 130. In other embodiments, predetermined limits can be set at any suitable levels to set corresponding alarm flags.

Control circuit 130 includes analog circuitry, digital circuitry and memory. In one embodiment, control circuit 130 is a micro-processor. In one embodiment, control circuit 130 is a micro-controller including analog inputs and a software program. The control circuit 130 is configured to communicate with communications circuit 132 via conductive path 134.

Communications circuit 132 receives communication signals from an outside source via communications conductor 136 and transfers the received signals to control circuit 130. Also, communications circuit 132 receives signals from control circuit 130 via conductive path 134 and transmits the received signals to an external receiver via communications conductor 136. In one embodiment, the external source communicates with sensor 102 via a telephone line. In another embodiment, the external source communicates with sensor 102 via a wireless transmitter/receiver.

Sensor 102 provides readings to the external source and ultimately the gas company. In one embodiment, communications circuit 132 receives a request for a reading and transmits the request to control circuit 130. In response, control circuit 130 transmits a reading to communications circuit 132, which transmits the reading to the external source. The reading includes cathodic protection voltage signal levels and/or alarms, tamper alarms, and gas usage data, such as the gas usage count.

In one embodiment, control circuit 130 includes a clock and control circuit 130 is programmed to send a reading on a particular date to the external source. Control circuit 130 transfers the reading to communications circuit 132, which transmits the reading to the external source on the given date. Also, in one embodiment, alarm information including cathodic protection alarms and tamper alarms are transmitted to the external source as the alarms occur.

The power supply circuit 134 supplies power to control circuit 130 and communications circuit 132. Control circuit 130 and communications circuit 132 are electrically coupled to power supply circuit 134 via a power line. In addition, control circuit 130 and communications circuit 132 are electrically coupled to a reference line that is connected to ground. The power line and reference line are not shown for clarity.

Power supply circuit 134 receives the cathodic protection voltage signal on supply side gas pipe 106 via power conductor 110. Even if the cathodic protection voltage signal on supply side gas pipe 106 is less negative than negative 850 millivolts, sensor 102 can still get enough energy from the cathodic protection voltage signal to power sensor 102.

In one embodiment, power supply circuit 134 includes an oscillator and a charge pump. The oscillator and charge pump are part of a boost regulator that boosts the difference between the cathodic protection voltage and ground to provide a regulated supply voltage level, such as 2.5 volts or more. The regulated supply voltage is maintained within a power supply voltage range, such as 2.25 volts to 2.75 volts. Power supply circuit 134 provides the boosted supply voltage to control circuit 130 and communications circuit 132 via the power line.

In one embodiment, power supply circuit 134 includes a backup battery. Power supply circuit 134 switches to backup battery power in the event the cathodic protection voltage signal level drops below a prescribed minimum value.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
   a first conductor configured to receive a signal via a supply side gas pipe;
   a second conductor configured to receive a reference signal via a reference path; and
   a circuit coupled to the first conductor and the second conductor and configured to receive the signal and the reference signal to provide power to the system.

2. The system of claim 1, wherein the signal comprises:
   a cathodic protection voltage on the supply side gas pipe.

3. The system of claim 1, wherein the signal comprises:
a voltage that is approximately negative 850 millivolts on the supply side gas pipe.

4. The system of claim 1, wherein the reference path comprises at least one of:
a customer side gas pipe;
a water pipe; and
a ground rod.

5. The system of claim 1, wherein the circuit comprises:
a boost regulator configured to receive the signal and provide a regulated supply voltage to the system, wherein the voltage difference between the regulated supply voltage and the reference signal is greater than the voltage difference between the signal and the reference signal.

6. The system of claim 1, comprising:
a control circuit configured to receive data signals that indicate gas usage.

7. The system of claim 1, comprising:
a control circuit configured to monitor the signal on the supply side gas pipe and provide an alarm signal in the event the signal on the supply side gas pipe crosses a predetermined threshold.

8. The system of claim 1, comprising:
a communication circuit configured to communicate with an external device.

9. The system of claim 8, wherein the communication circuit is configured to communicate via at least one of:
a wire; and
wirelessly.

10. A system comprising:
a first sensor configured to receive power from a signal on a gas pipe that supplies gas to a plurality of sites and configured to monitor the signal on the gas pipe at a first site of the plurality of sites; and
a second sensor configured to receive power from the signal on the gas pipe that supplies gas to the plurality of sites and configured to monitor the signal on the gas pipe at a second site of the plurality of sites.

11. The system of claim 10, wherein the first sensor is configured to provide a first alarm signal in the event the signal on the gas pipe exceeds a first predetermined value and the second sensor is configured to provide a second alarm signal in the event the signal on the gas pipe exceeds a second predetermined value.

12. The system of claim 10, wherein the first sensor is configured to obtain usage data that indicate gas usage at the first site of the plurality of sites and the second sensor is configured to obtain usage data that indicate gas usage at the second site of the plurality of sites.

13. The system of claim 10, wherein the first sensor comprises a first communication circuit configured to communicate wirelessly with an external device and the second sensor comprises a second communication circuit configured to communicate wirelessly with the external device.

14. A meter reading system comprising
a conductor configured to receive a cathodic protection signal from a supply side gas pipe; and
a meter reader electrically coupled to the conductor and configured to receive meter readings from a meter, wherein the meter reader receives the cathodic protection signal to provide a supply voltage to the meter reader.

15. The meter reading system of claim 14, wherein the meter reader comprises:
a power supply circuit configured to receive the cathodic protection voltage and provide a supply voltage to the meter reader, wherein the voltage difference between the supply voltage and a reference voltage is greater than the voltage difference between the cathodic protection voltage and the reference voltage.

16. The meter reading system of claim 14, wherein the meter reader comprises:
a control circuit configured to receive the meter readings; and
a communication circuit, wherein the control circuit is configured to communicate usage data via the communication circuit.

17. The meter reading system of claim 16, wherein the control circuit is configured to monitor the cathodic protection signal and communicate an alarm signal via the communication circuit in the event the cathodic protection signal exceeds a predetermined value.

18. A method for supplying power to a sensor comprising:
receiving a signal via a supply side gas pipe;
receiving a reference signal via a reference path; and
regulating the signal to provide power to the sensor.

19. The method of claim 18, wherein regulating the signal comprises:
boosting the difference between the signal and the reference signal to provide a supply voltage to the sensor.

20. The method of claim 18, comprising:
monitoring the signal on the supply side gas pipe; and
supplying an alarm signal if the signal exceeds a predetermined value.

21. The method of claim 18, comprising:
receiving readings that indicate gas usage from a gas meter; and
communicating usage data from the readings to an external device.

* * * * *